Aug. 25, 1959 K. E. SAGER 2,901,548

EDITOR FOR SOUND RECORDING AND REPRODUCING DEVICES

Filed Jan. 3, 1955 2 Sheets-Sheet 1

Inventor:
Karl E. Sager
By Soans, Glaister & Anderson Attys.

Aug. 25, 1959 K. E. SAGER 2,901,548

EDITOR FOR SOUND RECORDING AND REPRODUCING DEVICES

Filed Jan. 3, 1955 2 Sheets-Sheet 2

Inventor:
Karl E. Sager
By Soans, Glaister & Anderson Attys.

United States Patent Office 2,901,548 Patented Aug. 25, 1959

2,901,548

EDITOR FOR SOUND RECORDING AND REPRODUCING DEVICES

Karl E. Sager, Appleton, Wis.

Application January 3, 1955, Serial No. 479,426
8 Claims. (Cl. 179—100.1)

This invention relates generally to sound recording and reproducing devices and more particularly to means on a sound recording and reproducing device which enables one to selectively remove impressions previously formed on a carrier of sound impressions which is used in conjunction with said sound recording and reproducing device.

The present invention is applicable to conventional recording and reproducing devices such as magnetic tape or wire recorders, wax disc or cylinder machines, plastic belt dictating machines, and the like. By means of this invention, one can edit dictated or spoken material which is recorded on a carrier of sound impressions and later reproduced for transcription.

Various means have previously been provided on sound recording and reproducing machines for editing material recorded on a suitable carrier. These vary widely in the degree of precision, ease in operation, and adaptability to the particular methods of dictating machines. For example, very complicated devices have been devised for locating and removing a single musical sound in magnetic recording. This degree of precision is unnecessary for normal editing of material which will later be copied by a typist. Furthermore, such devices require complex and expensive components which are difficult to maintain in service.

On the other hand, existing commercial dictating machines have no satisfactory provision for editing dictated material. Well known commercial dictating machines are provided with special forms on which the dictator may note corrections, insertions, and the like for the guidance of the person who will later transcribe the dictation.

Most magnetic recording devices are equipped with one or more erasing elements with which to clear the entire magnetic carrier for subsequent re-use. With skill and luck, the dictator may use these devices to selectively remove portions of his dictation, but at the risk of spoiling desired parts of the record.

Other means of editing recorded material on magnetic-type dictating machines, such as means for impressing marker signals on the magnetic carrier to simplify later erasure, etc., have been suggested; however, these have not proven satisfactory. The suggested editing means generally require added circuits and controls which increase the complexity and cost of the dictating machines on which they are used and are subject to phase errors, breakdown, etc. which may cause incorrect editing or spoilage of a portion or all of the transcription on the magnetic carrier.

Commercial dictating machines which employ wax or plastic cylinders, discs, or belts have no means for erasing selected portions of the dictation. If the dictator makes the slightest error or omission, it must be noted, explained, and corrected by subsequent instructions to the transcriber. The procedure is cumbersome at best. The penalty of making a mistake places the dictator under an unnecessary strain. The transcriber also is compelled to watch for instructions which appear at a later point on the carrier which often leads to the transcription of dictation which should have been omitted or altered.

The objects of the present invention are to provide a sound recording and reproducing device with a simple means for erasing selected portions of recorded material from a carrier of sound impressions with a degree of accuracy previously obtained only in complicated equipment and by cumbersome manipulation; to provide such a means which is capable of erasing individual words, phrases, or sections from a carrier of sound impressions while the carrier of sound impressions runs continuously through the recording and reproducing device; to provide a sound recording and reproducing device with a simple editing means which compensates for the reaction time of the operator of the device; and to provide a commercial dictating machine with an editing means which is simple and rugged in construction, inexpensive to manufacture, durable in operation, and simple and effective in operation.

Further objects and advantages of the invention will be understood from the following description and accompanying drawings in which.

Figures 1, 2, 3:
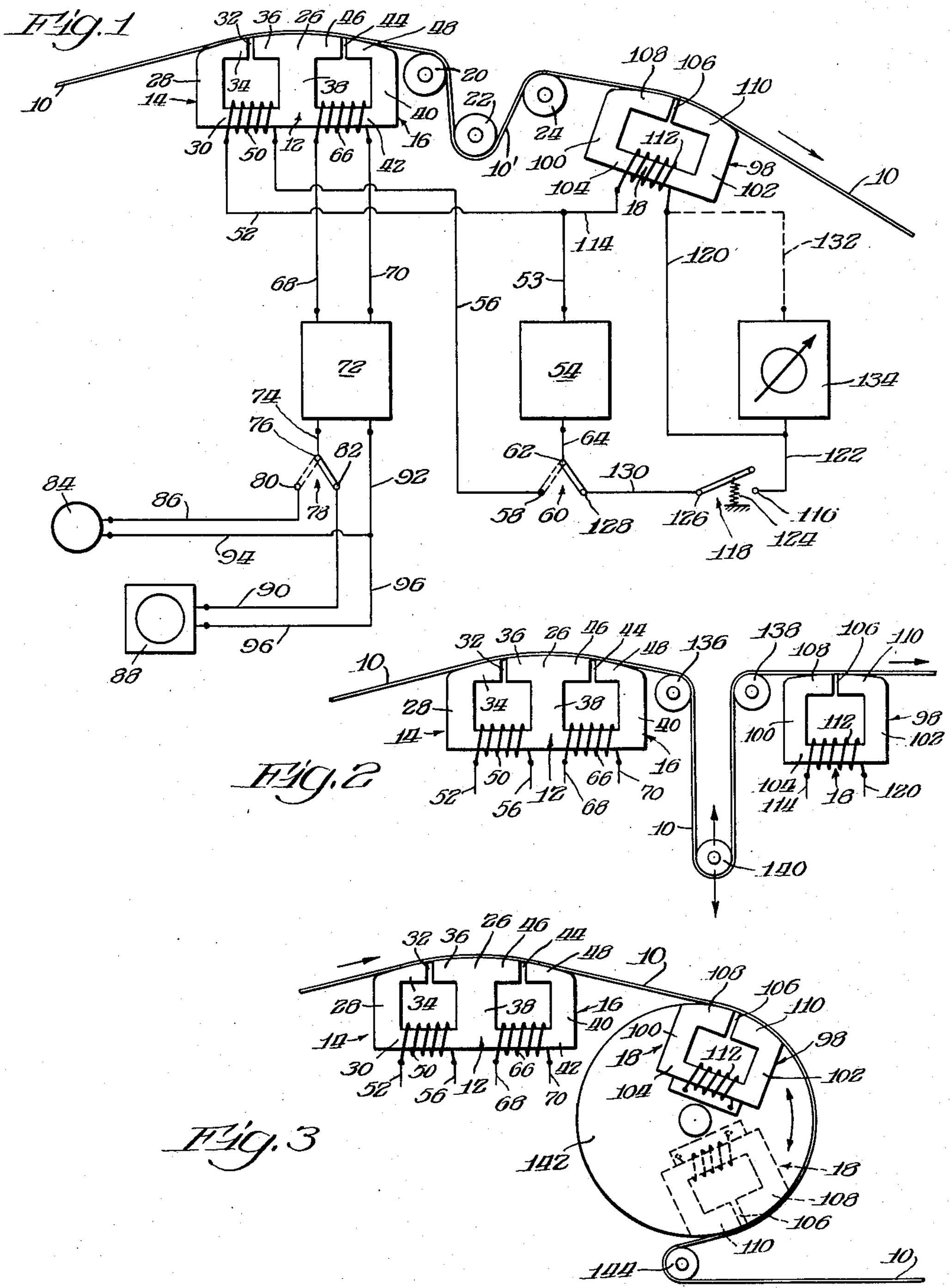
Figure 1 is a schematic drawing and wiring diagram of a portion of a magnetic tape or wire recorder which is provided with an editing means in accordance with the present invention.
Figures 2 and 3 are schematic drawings of portions of magnetic tape or wire recorders illustrating different means for controlling the path length of the carrier of sound impressions between the recorder head and a spaced erasing head.

In general, a sound recording and reproducing device constructed in accordance with the present invention includes an operator-controlled erasing element or means spaced "downstream" of the recording and reproducing means, i.e., the erasing means is spaced from the recording and reproducing means in that direction of movement of the carrier of sound impressions which reproduces the recorded material in its original form. This spaced erasing means is arranged for selective operation during the playback of recorded material to thereby edit the recorded material.

In this discussion, the word "carrier" is intended to include magnetizable tapes or wires which carry sound impressions as magnetic variations, and also plastic or wax discs, cylinders, or belts which carry sound impressions as engraved tracks.

The term "erasing element" is intended to include any one of several well known means to remove or obliterate recorded material from the carrier. Typical erasing elements for magnetic tape and wire recorders are illustrated by U.S. Patent Nos. 2,668,663, 2,535,481, etc. Permanent magnets which are arranged for movement into and out of contact with the magnetized carrier offer still another form of erasing element for magnetic tape and wire recorders. In the case of wax or plastic carriers which reproduce sound from engraved impressions, the erasing element may comprise a movable blunt stylus or any other suitable device which is capable of destroying the engraved sound impressions from the carrier.

The term "reproducing means" is intended to cover any one of the various conventional means of translating magnetic or engraved impressions into sound. United States Patent No. 2,418,542 illustrates one of the many reproducing means which is suitable for use with magnetic tape or wire carriers. Engraved sound impressions or tracks on discs, cylinders, belts, and the like may be reproduced by a pick-up element such as a phonograph needle which engages the track and connects with suitable amplifying means and sound diaphragms.

With the erasing element positioned downstream of the reproducing means, it is possible for the operator to listen to the recorded material and control the erasing element for approximately simultaneous erasure of selected portions of the recorded material. There is no need to mark portions of the recorded material for subsequent erasure or to code it for the guidance of the transcriber.

The erasing element should be spaced a sufficient distance from the reproducing means to give the operator sufficient time in which to react and to actuate the erasing element. In most cases, the operator will be the person who has dictated the material that is being edited, and therefore, can anticipate the approach of the material which is to be erased. The degree of accuracy required is far less than that necessary for editing a musical score, the sound track of a movie, or like material. Even if the operator misses part of a word, or erases part of a desired word, he will generally not have spoiled the recording for purposes of transcription by a capable typist. Deactivation of the erasing element follows the same pattern. The erasing element ceases to function as soon as the control means is released by the operator. The operator can anticipate when to stop erasing since great accuracy is not essential.

The response or reaction time of individuals to various types of signals has been the object of much study. Reaction time or response experiments show that the delay in response will vary, depending upon the nature of the signal, the complexity of thought needed for a response decision, and the physical movement involved. Recent data indicate that simple response to an audible signal is quite rapid if the subject is oriented to the signal, i.e., if he is conditioned to respond without complex analytical thought. In such cases, the average reaction time needed to push a control button or move a small lever is approximately one-fourth of a second. Individual reaction times may vary, however, generally being within the range of from one-eighth to four-tenths of a second. It is believed that a person editing his own dictation will follow a response pattern much like the simple response described above since the dictator is oriented or triggered to make simple discriminations between words or phrases of his own dictation. This can be done rapidly and generally does not require any time-consuming analytical thought. As will be described hereinafter, a recording and reproducing device may be provided with an editing means which is adapted to accommodate operators whose reaction times vary over a rather wide range. On the other hand, if desired, the editing means may be permanently fixed in a predetermined location which compensates for the reaction time of the average or of a desired user.

The magnetic recording and reproducing device illustrated in Figure 1 includes a magnetic carrier 10 (either tape or wire) which travels between a pair of reels or spools (not shown). In traveling between the spools, the magnetic carrier 10 passes through or over a recorder head 12 containing a conventional erasing section 14 and a conventional recording and reproducing or transducer section 16 with the erasing section 14 upstream of the transducer section 16. When recording sounds such as dictation, the magnetic carrier travels from left to right as shown by the arrow which allows the carrier to be erased or cleared in passing over an erasing section before receiving a magnetic impression from the transducer section.

Downstream of the recorder head 12 is a separate erase head 18 which is arranged for selective erasure as will be hereinafter described. The erase head 18 is suitably positioned along the path of movement of the magnetic carrier 10 so as to be in operative relationship relative thereto. The path length of the magnetic carrier 10 between the recorder head 12 and the erase head 18 is determined by the time interval which is to be allowed for a given point on the carrier to travel from the transducer section 16 to the erase head 18. This time interval may be equal to the average reaction time of typical operators as determined by suitable tests. This average time will generally be within the range of .25 to .30 second.

In an optional arrangement, the time interval for the travel of the magnetic carrier 10 between the transducer section 16 to the eraser head 18 may be slightly greater than the reaction time for the slowest operator, a typical time being perhaps .50 second.

The location of the heads 12 and 18 depends on the desired travel time of the magnetic carrier 10 between the heads 12 and 18, the speed of travel of the magnetic carrier, and the physical arrangement of the recording and reproducing device. To conserve space, the magnetic carrier may be arranged for travel along a curved path as defined by a series of pulleys, for example, such as along the curved path indicated by the line 10′, and defined by the positions of the pulleys 20, 22, and 24.

As previously stated, the recorder head 12 includes both an erasing section 14 and a transducer section 16. However, it should be understood that the two sections 14 and 16 may, if desired, be separated from one another. The recorder head 12 includes a common paramagnetic core 26 which functions for both the eraser and the transducer sections 14 and 16, respectively. The core 26 may be of any suitable shape, and a convenient shape is the overall, generally rectangular form as illustrated in Figure 1.

The portion of the core 26 functioning for the erasing section 14 includes an outside vertical leg 28, a lower horizontal leg 30, and a top leg which is split to provide a non-magnetic gap 32 defined by confronting pole pieces 34 and 36 on either side of the gap. This portion of the core 26 is completed by an inner vertical leg 38 which is common to both the erasing section 14 and the transducer section 16.

The portion of the core 26 functioning as the transducer section includes an outside vertical leg 40, a lower horizontal leg 42, the common inner vertical leg 38, and an upper leg which is split to provide a non-magnetic gap 44 defined by confronting pole pieces 46 and 48 on either side of the gap.

Around the leg of the erasing section is a coil 50, one end of which may be connected through conductors 52 and 53 to a suitable high frequency oscillator diagrammatically illustrated at 54. The other end of the coil 50 may be connected through a conductor 56 to a contact 58 of a two-way switch 60. A contact 62 of the two-way switch 60 is connected to the oscillator 54 through a conductor 64. One position of the switch 60 connects the contacts 58 and 62, thereby interconnecting the high frequency oscillator 54 with the coil 50 which causes the erasing section 14 to be in operative condition. In a second position of the switch 60, the contacts 58 and 62 are disconnected and the erasing section 14 is inoperative. The high frequency oscillator 54 may embody its own source of power or may be connected in the usual manner (not shown) to any suitable or available source of supply.

Around the leg 42 of the transducer section 16 is a coil 66, the opposite ends of which may be connected through conductors 68 and 70 to an audio-amplifier 72. The audio-amplifier 72 may also embody its own source of power or may be connected in the usual manner (not shown) to any suitable source of power. The audio-amplifier 72 is in turn connected through a conductor 74 to a contact 76 of a two-way switch 78. The switch 78 also includes contacts 80 and 82. The contact 80 is connected to a microphone or equivalent pick-up device 84 through a conductor 86. The contact 82 is connected to a loudspeaker or equivalent device 88 through a conductor 90. A conductor 92 extends from the audio-amplifier 72 to a conductor 94 which connects with the microphone 84, and to a conductor 96 which connects with the loudspeaker 88. When the switch 78 is in one position, the contact 76 is connected with the contact 80, therefore forming a closed circuit between the audio-amplifier and the microphone and when the switch is in its second position, the contact 76 is connected with the contact 82 forming a closed circuit between the audio-amplifier 72 and the loudspeaker 88.

The erase head 18 includes a paramagnetic core 98 having outer vertical legs 100 and 102, a lower horizontal leg 104, and a top leg which is split to provide a nonmagnetic gap 106 defined by confronting pole pieces 108 and 110 on either side of the gap. Around the lower horizontal leg 104 is a coil 112, one end of which is connected to the high frequency oscillator 54 through the conductors 114 and 53. The other end of the coil 112 is connected to a contact 116 of a selective erase key 118 through the conductors 120 and 122. The erase key 118 is preferably provided with a biasing means such as the spring 124 so as to keep the key in open position unless manually depressed by the operator. The other contact 126 of the erase key 118 is connected to a contact 128 of the two-way switch 60 through a conductor 130. When the two-way switch is set so as to form a circuit between the contacts 62 and 128 and the erase key 118 is depressed, the erase head 18 will be actuated by the high frequency oscillator 54.

As an alternative arrangement, the end of the coil opposite that which connects with the conductor 114 may be connected through a conductor 132 (shown in dotted line in Figure 1) to an ordinary time-delay unit 134, either mechanical or electronic, which in turn is connected to the conductor 122 which connects with the contact 116 of the selective erase key 118.

It should be understood that the general operating details of the apparatus are well-known and therefore not illustrated or described herein. For example, means to wind and rewind the magnetic carrier, speed and overrun controls, and the like are illustrated in United States patents, such as Patent Nos. 2,513,423, 2,563,545, 2,615,641, and 2,632,060.

During recording, the switches 60 and 78 are placed in the positions indicated by the broken lines in Figure 1. The switches 60 and 78 may be mounted on a common shaft so that one control knob will operate both switches. A neutral position of switches 60 and 78 disconnects all components which they control. When the switches are in the position shown by the broken lines, the microphone 84 is connected to the audio-amplifier 72 which in turn is connected to the coil 66 on the transducer section of the recorder head 12, and the high frequency oscillator 54 is connected in the circuit passing through the coil 50 on the erasing section 14 of the recorder head 12. In this operation, the magnetic carrier 10 which travels over the recorder head 12 in the direction indicated by the arrow is continually erased just before it receives a new magnetic impression. During this operation, the erase head 18 is inoperative.

At such time which the operator wishes to listen to material recorded on the magnetic carrier 10, he first moves the switches 60 and 78 to neutral position; next, he reverses the direction of travel of the carrier 10 so as to rewind the carrier 10; then he moves the switches 78 and 60 to the positions indicated by the solid lines in Figure 1. Switch 78 then connects the loud speaker 88 to the audio-amplifier 72 which in turn is connected to the coil 66 of the transducer section 16 of the recorder head 12; and switch 60 connects the high frequency oscillator 54 with the contact 126 of the selective erase key 118. Finally, the operator again runs the carrier 10 over the recorder head 12 in the direction shown by the arrow in Figure 1. As previously stated, the contact 116 of the erase key 118 is connected with one end of the coil 112 of the erase head either directly or through the time-delay unit 134. The time-delay unit 134 is optional and is generally used where additional flexibility of control is desired.

To edit material recorded on a magnetic carrier 10, the operator operates the recorder in the same manner as when he wishes to listen to recorded material on the magnetic carrier 10. Both the erasing section 14 of the recorder head 12, and the erase head 18 are disconnected; however, the erase head 18 may be energized by closing the selective erase key 118. This is done by the operator when he wishes to erase some portion of the transcription. As the magnetic impression which is to be erased passes the transducer section 16 and is audibly reproduced, the operator presses the erase key, thereby actuating the erase head 18 and causing the magnetic impression on the carrier 10 to be erased immediately after the sound impression thereof has been received. As soon as the operator wishes to discontinue the erasure of the magnetic transcription, he releases the erase key 118 whereupon the spring 124 immediately causes the erase key 118 to open, thereby breaking the circuit between the high frequency oscillator 54 and coil 112 and deactuating the erase head 18.

The reaction time of the operator, previously discussed, becomes important in the selective erasure operation. In most magnetic recording devices which employ magnetic tapes as the magnetic carrier 10, the magnetic tapes travel at speeds ranging from 3.5 inches per second to 15 or more inches per second with an average speed of around 7.5 inches per second. In magnetic records of the wire recorder type, the speed of the magnetic carrier is generally somewhat greater and frequently exceeds a speed of 15 inches per second. Using an average tape speed of 7.5 inches per second for illustration, an operator delay of .25 second will allow the tape to travel 1⅞ inches before the erase key can be actuated in response to a sound reproduced by the transducer section. If that sound is to be erased with precision, the tape must be arranged to travel 1⅞ inches between the transducer and the erase head.

In the most simple recording device embodying the present invention, the position of the erase head 18 may be determined by the above method and then permanently located without provision for adjustment. At any given carrier speed, the operator will have a fixed time interval in which to react to the sound reproduced by the transducer, audio-amplifier, and loud speaker and to operate the selective erase key for selective editing and erasure. When he arrives at the end of the erasure, he will have the same time interval in which to release the key, thereby preventing over-erasure on account of reaction delay.

A more flexible arrangement is provided by the use of the optional time-delay unit 134. In this arrangement, the amount of time delay may be preset or adjusted according to the requirements of the individual operator. The travel distance between the transducer and the erase head is made great enough to take into account the reaction time of the slowest operator. When the carrier speed is 7.5 inches per second and the maximum anticipated operator delay is .5 second, the travel distance of the tape between the transducer section 16 and the erase head 18 should be approximately 3¾ inches. This may be provided by passing the carrier 10 around the pulleys 20, 22, and 24, as indicated by the line 10′ in Figure 1 or by suitable positioning of the erase head 18. In this arrangement, the recording device can compensate for the reaction time of various operators which may range from a minimum approaching zero seconds to a maximum of .5 second or greater by suitable adjustment of the time-delay unit. For example, assuming a reaction time of .3 second for a given operator, the time-delay unit would be set for a time delay of .2 second to energize the erase head precisely .5 second after a given spot on the carrier 10 which is to be erased passes over the transducer section 16. The reaction time of a slow operator will be balanced by setting the time-delay unit so as to provide for a smaller time delay than .2 second. In all cases, when properly adjusted, the total time delay between the passage of the section of the carrier 10 to be erased over the transducer section 16 and the passage of that section over the erase head 18 should be .5 second under these conditions.

Figures 2 and 3 illustrate modified arrangements for varying the travel distance of the carrier 10 between the transducer section 16 and the erase head 18 according to individual operator requirements. Since, in these embodiments, the recorder head 12 and the erase head 18 as well as the connections between these units and the other portions of the recording and reproducing device may be similar to that shown in Figure 1, similar reference numerals, wherever possible, are applied to identical parts.

In Figure 2, the magnetic carrier 10, after it passes the transducer section 16, travels over fixed pulleys 136 and 138, and an adjustable pulley 140 before contacting the erase head 18. The distance of travel of the magnetic carrier 10 and therefore the time available to compensate for operation reaction time is adjustable over relatively wide range. This arrangement may therefore provide a mechanical alternative to the time-delay unit arrangement shown in Figure 1.

In the embodiment illustrated in Figure 3, the distance of travel of the magnetic carrier 10 between the transducer section 16 and the erase head 18 is made adjustable by mounting the erase head 18 within or on a movable member such as the rotatable wheel 142. In this arrangement, the magnetic carrier 10 travels from the transducer section 16 around part of the circumference of the wheel 142 including the erase head 18 and then around a pulley 144. The wheel 142 is arranged to rotate through a predetermined angle of about 120°. Thus, a 2-inch diameter wheel will allow an adjustment of about 2 inches in the position of the erase head 18 along the path of carrier travel. The position of the wheel 142 and erase head 18 may thus be adjusted according to the operator's requirements.

Depending upon the length of the erasure and the desire of the operator, new material may be inserted in the erased portion of the magnetic carrier 10 in the following manner. The carrier 10 is rewound the necessary distance and then re-run in playing direction. The operator listens to the recording until it arrives at the erasure. He then stops the carrier 10 and throws the switches to the dotted position shown in Figure 1 which is the recording position for the device. New material may then be recorded on the carrier 10 up to the capacity of the erased portion of the carrier. If the operator wishes to continue beyond that point, he may do so without interruption, however, previously recorded material will be erased as it passes the erase head 18. In most instances, the operator will be merely inserting a corrected word or phrase, and will time himself to use less than the amount of carrier he has previously erased, thus avoiding conflict with subsequent parts of his dictation.

When editing and necessary re-dictation has been completed, the magnetic carrier is rewound and is then ready to be copied. This may be done on the same recording device or by moving the magnetic carrier reel to a special transcribing device which may be more convenient to the typist or transcriber. Transcribing is done in the usual manner but with the considerable advantage that the transscriber receives only corrected dictation and pertinent instructions. Speed and accuracy of the transcription will therefore be improved.

It should be understood that the present invention may be used in a multiple track tape recorder or in conjunction with auxiliary equipment such as a sensing device which would prevent accidental over-run into previously dictated material when the operator is recording material on an erased portion of the carrier.

Figure 4:
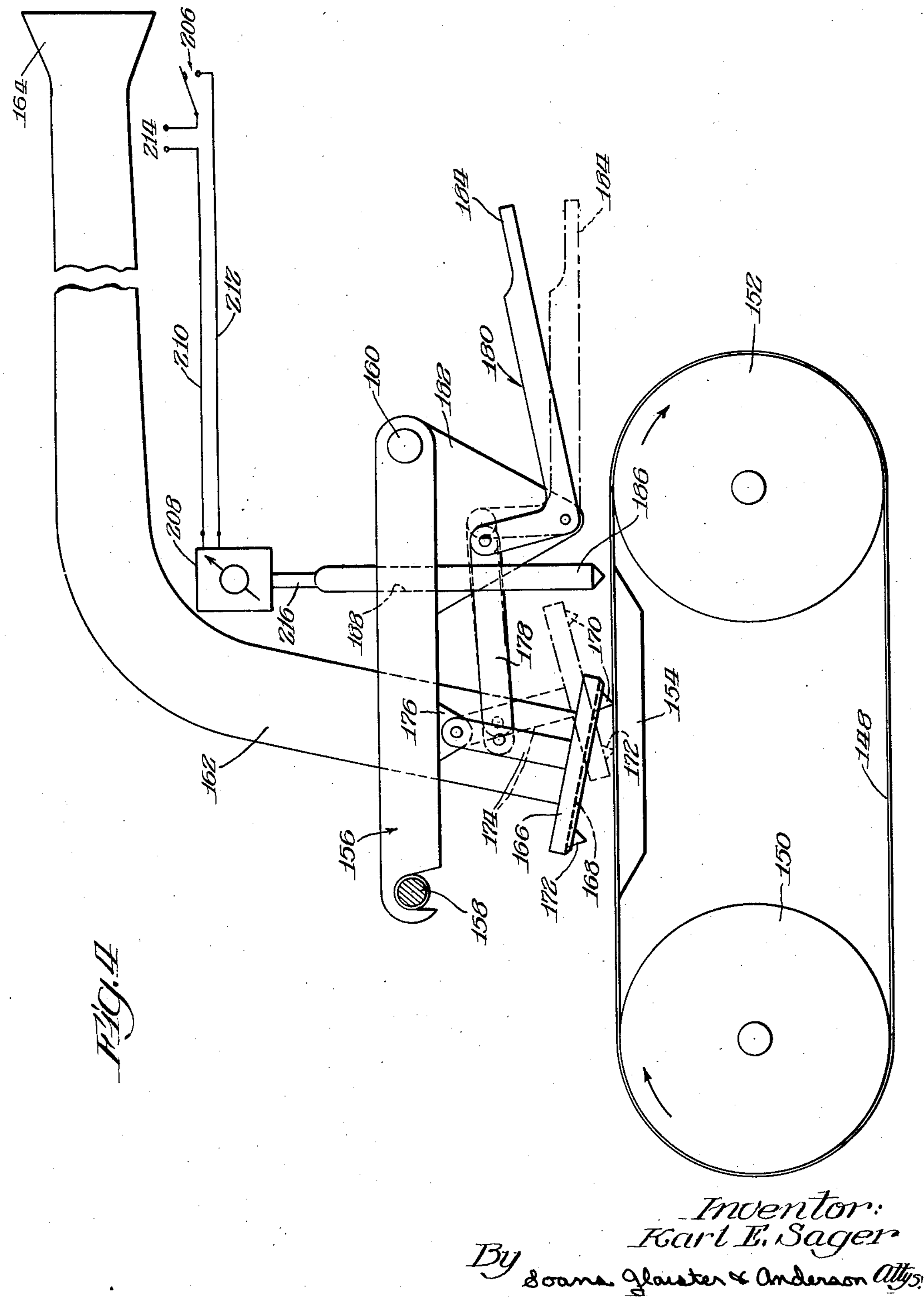
Figure 4 is a schematic drawing of a plastic belt-type recorder which is provided with editing means in accordance with the present invention.

Figure 4 illustrates the present invention as applied to a stylus type recording device. In this arrangement, an endless plastic belt 148 is used as the carrier for receiving engraved sound impressions. However, wax discs or cylinders may be used in generally similar arrangements.

The plastic belt 148 is trained about a suitable driving drum 150 and a rotatable tensioning drum 152. The driving drum 150 may rotate in either direction, however, it is normally arranged for rotation in only one direction; for example, in the direction illustrated by the arrow in Figure 4. The upper run of the plastic belt 148 is generally supported by a suitable member such as the plate 154.

The recording and reproducing mechanism of this recording device are mounted on a movable frame 156 which is supported adjacent its ends on a threaded shaft 158 and on a smooth shaft 160. The shaft 158 may be driven from the same source of power (not shown) as that which drives the drum 150. The rotation of the shaft 158 causes the frame 156 to move transversely of the direction of movement of the plastic belt 148. The frame 156 may be repositioned as desired with respect to the plastic belt 148 either by reversing the direction of rotation of the shaft or by temporarily disengaging the frame 156 from the shaft 158 and then moving the frame relative to the belt. In the illustrated device, the frame 156 supports a flexible tube 162, the upper end of which connects with a speaking and recording trumpet 164 and the lower end of which connects with a rigid head 166. The head 166 supports a diaphragm 168. It should be understood that other means, either mechanical or electrical, may be used in place of the flexible tube 162 and trumpet 164 for receiving and reproducing sound impressions. Styluses 170 and 172 are mounted upon the lower face of the diaphragm 168. The styluses 170 and 172 are used for forming an impression upon and for reproducing material previously recorded on the plastic belt 148, respectively. Normally, the reproducing stylus 172 is of lighter weight than the stylus 170 which is used for forming the sound impressions upon the plastic belt 148. If desired, the styluses 170 and 172 may each be mounted on separate diaphragms (not shown) which may be connected to well-known mechanical or electrical mechanisms for receiving and reproducing sound impressions.

In the simplified device illustrated in Figure 4, an arm 174 is integral with and extends upwardly from the head 166 and is pivotally connected adjacent its upper end to an ear 176 which depends from the frame 156. A link 178 is pivotally connected adjacent one of its ends to the arm 174 at a point intermediate the length thereof and adjacent its other end to a bell-crank 180 which is pivoted for rotation about a point located adjacent the lower end of an enlarged ear 182 which depends from the frame 156. The outer free end of the bell-crank 180 forms a lever or handle 184 which can be shifted from the position shown in Figure 4 where the stylus 170 is in contact with the plastic belt 148 to the position indicated by the dotted lines in Figure 4 where the stylus 172 is in contact with the plastic belt 148. At an intermediate position, both styluses will be in raised positions relative to the plastic belt 148 and in this position it is possible to remove or change the plastic belt 148 without injury thereto.

In order to record sound impressions, the operator moves the lever to the solid line position shown in Figure 4, whereupon the stylus 170 will contact and press into the surface of the plastic belt 148. The operator then energizes the driving means which causes the plastic belt 148 to move around the drums 150 and 152 while the threaded shaft 158 moves the frame 156 transversely of the belt, causing the stylus 170 to engrave a spiral track of sound impressions in the surface of the plastic belt.

To reproduce the recorded material, the operator deenergizes the driving mechanism, then moves the lever 184 so as to raise the stylus 170 from the plastic belt 148. He then repositions the frame 156 so that the stylus 172 is over the initial portion of the plastic belt 148 and moves the lever 184 to the dotted line position shown in Figure 4. Finally, the operator re-energizes the driving mechanism, enabling the stylus 172 to transmit vibrations to the diaphragm 168 as it moves along the grooves in the plastic belt 148.

The erase mechanism on this recording and dictating device is provided for by an erase stylus 186 which extends through a passageway 188 in the frame 156. The passageway 188 within the frame 156 provides an accurate means for positioning the lower end of the stylus 186 relative to the plastic belt 148 and is located so as to cause the stylus 186 to enter either the engaged groove which is being reproduced by the stylus 172 or the adjacent groove which has been just reproduced. The stylus 186 is rigidly supported and its lower end is shaped so as to obliterate the engaged track which it enters, preferably leaving a smooth, noiseless track, but without damage to adjacent tracks. The erase stylus 186 is so mounted that it does not damp the vibrations of the pick-up stylus, thereby permitting clear reproduction of the recorded sound while it is obliterating the just-reproduced sound impression.

Stylus recorders of this type may also be arranged to compensate for operator reaction time, but with somewhat less flexibility than is possible in a magnetic recorder. A typical surface speed for a plastic belt type recorder is about 9 inches per second. An operator reaction time of .25 second would suggest the location of the erase stylus at a point about 2.25 inches from the reproducing stylus. In most plastic belt or cylinder recorders, this spacing would locate the erase stylus part way around the circumference of the engraved carrier.

Preferably, erase stylus 186 is mounted as shown in solid outline in Figure 4, positioned to enter one groove away and downstream from the groove being reproduced. This would permit a maximum time delay of 1⅓ seconds assuming a 12-inch circumference plastic belt 148 and a 9-inch per second surface speed. In this arrangement, a control switch 206 connects with a time-delay unit 208 through conductors 210 and 212 and source of power 214. The time-delay unit 208, which may be of any common well-known type, is mechanically connected through a movable piston 216 to the upper end of the stylus 186, thus controlling the operation thereof. Stylus recorders having electronic circuits can be modified quite easily to include this improvement. Assuming an operator's reaction time lag of ⅓ second, the time-delay unit 208 would be set to add another second of delay, making a total time delay of 1⅓ seconds. By that time, the sound groove to be erased will have travelled around the circumference of the belt and advanced one groove downstream. The stylus 186 will therefore begin or end the erasure at the proper point.

To compensate for operator reaction time in a wax disc or cylinder type recorder (not shown), the erase stylus may be carried on a rotatable support for positioning at any desired location around the circumference of the disc or cylinder.

The above described arrangements permit the operator to edit recorded material in a stylus type recorder in the same general manner as that previously described in connection with the magnetic recorder illustrated in Figures 1 through 3. However, in most cases, where stylus type recorders are used, it will not be feasible to re-record on erased portions of the engraved track. The primary advantage of the present invention still remains, however, and the transcriber will receive a record which is free from superfluous material.

Various modifications may be made in the arrangement and design of the apparatus described above without departing from the scope of the invention as defined in the following claims.

I claim:

1. In a sound recording and reproducing device, a carrier of sound impressions, a sound impressing element for recording sound impressions on said carrier, a pick-up element actuated by sound impressions located on said carrier, means connected with said pick-up element for converting the signals received by said pick-up element from said sound carrier into intelligible sound, an erase element spaced from said pick-up element which is adapted for erasing undesired sound impressions from said carrier at the same time that said pick-up element is receiving signals from said carrier, means for transporting said carrier of sound impressions past said sound impressing element, said pick-up element and said erase element, control means for activating either said sound impressing element or said pick-up element and simultaneously inactivating the other of said elements, said erase element being spaced from said pick-up element in that direction of movement of said carrier of sound impressions which permits the sound to be reproduced in its original form, a manually operable control for activating said erase element, and operator adjustable means for varying the time interval between reproduction of a sound in its original form by said pick-up element and operator controlled erasure of said sound by said erase element to compensate for operator reaction time, whereby the closing of said control by the operator promptly in response to hearing an undesired portion of the recording and the opening of said control promptly in response to hearing the end of said undesired portion of the recording will automatically cause the proper erasure of said undesired portion of the recording from said carrier.

2. In a sound recording and reproducing device, a carrier of sound impressions, a sound impressing element for recording sound impressions on said carrier, a pick-up element actuated by sound impressions located on said carrier, means connected with said pick-up element for converting the signals received by said pick-up element from said sound carrier into intelligible sound, an erase element spaced from said pick-up element which is adapted for erasing undesired sound impressions from said carrier at the same time that said pick-up element is receiving signals from said carrier, means for transporting said carrier of sound impressions past said sound impressing element, said pick-up element and said erase element, control means for activating either said sound impressing element or said pick-up element and simultaneously inactivating the other of said elements, said erase element being spaced from said pick-up element in that direction of movement of said carrier of sound impressions which permits the sound to be reproduced in its original form, a manually operable switch for activating said erase element, biasing means for maintaining said switch in open position, and means for varying the path length of said carrier between said pick-up element and said erase element so as to compensate for operator reaction time, whereby the closing of said switch by the operator promptly in response to hearing an undesired portion of the recording and the release of said switch promptly in response to hearing the end of said undesired portion of the recording will automatically cause the proper erasure of said undesired portion of the recording from said carrier.

3. In a sound recording and reproducing device, a carrier of sound impressions, a sound impressing element for recording sound impressions on said carrier, a pick-up element actuated by sound impressions located on said carrier, means connected with said pick-up element for converting the signals received by said pick-up element from said sound carrier into intelligible sound, an erase element spaced from said pick-up element which is adapted for erasing undesired sound impressions from said carrier at the same time that said pick-up element is receiving signals from said carrier, means for transporting said carrier of sound impressions past said sound impressing element, said pick-up element and said erase element, switch means for activating either said sound impressing element or said pick-up element and simultaneously inactivating the other of said elements said erase element being spaced from said pick-up element in that direction of movement of said carrier of sound impressions which permits the sound to be reproduced in its original form, a manually operable switch for actuating said erase element, biasing means for maintaining said switch in open position, and an adjustable time-delay unit connected between said erase element and said switch for activating said erase element at a spaced time interval after the operation of said switch to thereby compensate for operator reaction time, whereby the closing of said switch by the operator promptly in response to hearing an undesired portion of the recording and the release of said switch promptly in response to hearing the end of said undesired portion of the recording will automatically cause the proper erasure of said undesired portion of the recording from said carrier.

4. In a magnetic recording and reproducing device, a carrier of sound impressions, a recorder head including a transducer section for recording sound impressions on said carrier and for receiving signals fom sound impressions previously recorded on said carrier, means connected with said transducer section when said section is set for receiving signals from said carrier for converting said signals into intelligible sound, an erase head spaced from said recorder head which is adapted for erasing undesired sound impressions from said carrier at the same time that said transducer section is receiving signals from said carrier, means for transporting said carrier of sound impressions past said recorder head and said erase head, control means for said transducer section which permits said section to operate at any given time only for recording sound impressions on said carrier or for receiving signals from sound impressions previously recorded on said carrier, said erase head being spaced from said recorder head in that direction of movement of said carrier of sound impressions which permits the sound to be reproduced in its original form, a manually operable switch for activating said erase head, biasing means for maintaining said switch in open position unless held in closed position, and operator adjustable means for varying the time interval between reproduction of a sound in its original form by said pick-up element and operator controlled erasure of said sound by said erase head to compensate for operator reaction time, whereby the closing of said switch by said operator promptly in response to hearing an undesired portion of the recording and the opening of said switch promptly in response to hearing the end of said undesired portion of the recording will automatically cause the proper erasure of said undesired portion of the recording from said carrier.

5. In a magnetic recording and reproducing device, a carrier of sound impressions, a recorder head including a transducer section for recording sound impressions on said carrier and for receiving signals from sound impressions previously recorded on said carrier, means connected with said transducer section when said section is set for receiving signals from said carrier for converting said signals into intelligible sound, an erase head spaced from said recorder head which is adapted for erasing undesired sound impressions from said carrier at the same time that said transducer section is receiving signals from said carrier, means for transporting said carrier of sound impressions past said recorder head and said erase head, control means for said transducer section which permits said section to operate at any given time only for recording sound impressions on said carrier or for receiving signals from sound impressions previously recorded on said carrier, said erase head being spaced from said recorder head in that direction of movement of said carrier of sound impressions which permits the sound to be reproduced in its original form, a manually operable switch for activating said erase head, biasing means for maintaining said switch in open position unless held in closed position, and means for varying the path length of said carrier between said recorder head and said erase head so as to compensate for operator reaction time, whereby the closing of said switch by the operator promptly in response to hearing an undesired portion of the recording and the opening of said switch promptly in response to hearing the end of said undesired portion of the recording will automatically cause the proper erasure of said undesired portion of the recording from said carrier.

6. In a magnetic recording and reproducing device, a carrier of sound impressions, a recorder head including a transducer section for recording sound impressions on said carrier and for receiving signals from sound impressions previously recorded on said carrier, means connected with said transducer section when said section is set for receiving signals from said carrier for converting said signals into intelligible sound, an erase head spaced from said recorder head which is adapted for erasing undesired sound impressions from said carrier at the same time that said transducer section is receiving signals from said carrier, means for transporting said carrier of sound impressions past said recorder head and said erase head, switch means for said transducer section which permits said section to operate at any given time only for recording sound impressions on said carrier or for receiving signals from sound impressions previously recorded on said carrier, said erase head being spaced from said recorder head in that direction of movement of said carrier of sound impressions which permits the sound to be reproduced in its original form, a manually operable switch for actuating said erase head, biasing means for maintaining said switch in open position unless held in closed position, and an adjustable time-delay unit connected between said erase head and said switch for activating said erase head at a spaced time interval after the operation of said switch to thereby compensate for operator reaction time, whereby the closing of said switch by the operator promptly in response to hearing an undesired portion of the recording and the opening of said switch promptly in response to hearing the end of said undesired portion of the recording will automatically cause the proper erasure of said undesired portion of the recording from said carrier.

7. In a magnetic recording and reproducing device, a carrier of sound impressions, a recorder head including a transducer section for recording sound impressions on said carrier and for receiving signals from sound impressions previously recorded on said carrier, means connected with said transducer section when said section is set for receiving signals from said carrier for converting said signals into intelligible sound, an erase head spaced from said recorder head which is adapted for erasing undesired sound impressions from said carrier at the same time that said transducer section is receiving signals from said carrier, means for transporting said carrier of sound impressions past said recorder head and said erase head, switch means for said transducer section which permits said section to operate at any given time only for recording sound impressions on said carrier or for receiving signals from sound impressions previously recorded on said carrier, said erase head being spaced from said recorder head in that direction of movement of said carrier of sound impressions which permits the sound to be reproduced in its original form, a manually operable switch for activating said erase head, biasing means for maintaining said switch in open position unless held in closed position, means for varying the path length of said carrier between said recorder and said erase head, and an adjustable time-delay unit connected between said erase head and said switch for actuating said erase head at a spaced time interval after the operation of said switch to thereby compensate for operator reaction time, whereby the closing of said switch by the operator promptly in response to hearing an undesired portion of the recording and the opening of said switch promptly in response to hearing the end of said undesired portion of the recording will automatically cause the proper erase of said undesired portion of the recording from said carrier.

8. In a stylus type recording and reproducing device, a carrier of sound impressions, a sound impressing stylus for recording sound impressions on said sarrier, a reproduce stylus for receiving signals from said sound impressions on said carrier, means connected with said reproduce stylus for converting the signals received by said reproduce stylus into intelligible sound, an erase stylus spaced from said reproduce stylus which is adapted for erasing undesired sound impressions from said carrier at the same time that said reproduce stylus is receiving signals from said carrier, means for transporting said carrier of sound impressions past said sound impressing stylus, said reproduce stylus and said erase stylus, control means for activating either said sound impressing stylus or said reproduce stylus and simultaneously inactivating the other of said styluses, said erase stylus being spaced from said reproduce stylus in that direction of movement of the carrier of sound impressions which permits the sound to be reproduced in its original form, a manually operable switch for controlling said erase stylus, biasing means for maintaining said switch in open position unless held in closed position, and an adjustable time-delay unit connected between said erase stylus and said switch for activating said erase stylus at a spaced time interval after the operation of said switch to thereby compensate for operator reaction time, whereby the closing of said switch by the operator promptly in response to hearing an undesired portion of the recording and the release of said switch promptly in response to hearing the end of said undesirable portion of the recording will automatically cause the proper erasure of the undesired portion of the recording on said carrier.

References Cited in the file of this patent

UNITED STATES PATENTS

| | | |
|---|---|---|
| 2,380,392 | Begun | July 31, 1945 |
| 2,561,698 | Hagan | July 24, 1951 |
| 2,729,454 | Vides | Jan. 3, 1956 |
| 2,782,263 | Hoehn | Feb. 19, 1957 |